(12) United States Patent
Nakamura et al.

(10) Patent No.: US 6,491,586 B1
(45) Date of Patent: Dec. 10, 2002

(54) FLOW PASSAGE STRUCTURE FOR SHAFT-PRESS-FITTED FLANGE MEMBERS

(75) Inventors: Takashi Nakamura, Wako (JP); Mikio Shoji, Wako (JP); Katsuyuki Narai, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 49 days.

(21) Appl. No.: 09/731,009

(22) Filed: Dec. 7, 2000

(30) Foreign Application Priority Data

Dec. 9, 1999 (JP) .......................................... 11-349656

(51) Int. Cl.⁷ ............................................. F16H 45/02
(52) U.S. Cl. ......................................... 464/24; 192/3.3
(58) Field of Search ........................ 172/3.3; 192/3.29, 192/3.28; 477/475; 474/28, 18; 464/185, 24

(56) References Cited

U.S. PATENT DOCUMENTS

| | | | |
|---|---|---|---|
| 2,815,684 A | * 12/1957 | Roche ........................ | 192/3.29 |
| 3,053,115 A | 9/1962 | Cartwright et al. | |
| 3,068,974 A | * 12/1962 | Jandasek .................... | 192/3.3 |
| 3,189,144 A | * 6/1965 | Gabriel ...................... | 192/3.28 |
| 3,253,684 A | * 5/1966 | Maurice ..................... | 192/3.29 |
| 3,497,043 A | * 2/1970 | Leonard ..................... | 192/3.29 |
| 3,893,551 A | * 7/1975 | Ahlen ........................ | 192/3.33 |
| 3,937,103 A | * 2/1976 | Kleinhans .................... | 74/572 |
| 4,002,228 A | * 1/1977 | Borman ..................... | 192/3.29 |
| 4,202,431 A | 5/1980 | Yamamori et al. | |
| 4,335,587 A | * 6/1982 | Thomamueller et al. ..... | 403/223 |
| 4,382,496 A | * 5/1983 | Yamamori et al. ......... | 192/3.29 |
| 4,716,998 A | * 1/1988 | Tsukamoto et al. .......... | 192/3.3 |
| 4,974,715 A | * 12/1990 | Koyama ..................... | 192/3.29 |
| 5,113,984 A | 5/1992 | Benford | |
| 5,400,884 A | * 3/1995 | Matsuoka ................... | 192/3.25 |

FOREIGN PATENT DOCUMENTS

| | | |
|---|---|---|
| DE | 934 456 C | 10/1955 |
| JP | 02-40904 | 9/1990 |

* cited by examiner

Primary Examiner—Greg Binda
Assistant Examiner—Kenneth Thompson
(74) Attorney, Agent, or Firm—Armstrong, Westerman & Hattori, LLP

(57) ABSTRACT

In a stator shaft in which a shaft member is press-fitted into a press-fit bore of a flange member, first flow passages are formed in the shaft member, and blind bores extending linearly at right angles to a shaft axis from outer circumferential surfaces of the flange member and through the press-fit bore, and communication bores 103 extending linearly from a side surface of the flange member and communicating with free end portions of the blind bores are further formed. Oil passages formed of the parts of the blind bores which extend from the press-fit bore to the free end portions thereof, and communication bores constitute second flow passages, and the shaft member is press-fitted into the press-fit bore with the shaft member positioned so that the portions of the second flow passages which are opened in the press-fit bore, and first flow passages communicate with each other in a mutually opposed state, whereby the first and second flow passages are communicated with each other.

5 Claims, 5 Drawing Sheets

FLOW PASSAGE STRUCTURE FOR SHAFT-PRESS-FITTED FLANGE MEMBERS

FIELD OF THE INVENTION

This invention relates to a flow passage structure formed by press-fitting a shaft member into a press-fit bore provided in a flange member so as to be opened at one axial end thereof, and thereby communicating with each of other flow passages formed in the flange member and those formed in the shaft member.

BACKGROUND OF THE INVENTION

Such a flow passage structure is used for a support flange ember of a fluid joint, and a support flange of a stator member of a torque converter as disclosed in, for example, Japanese Patent Publication No. 40904/1990. An example of such a related art flow passage structure for a shaft-press-fitted flange member is shown in FIG. 5. This structure is formed by press-fitting a shaft member 210 into a press-fit bore 201 of a flange member 200 so as to communicate an oil passage 221 in a housing 220, to which the flange member 200 is fixed, and radial bores 212, which are formed in the shaft member 210, with each other via an inside-flange flow passage including radial bores 202 and axial bores 203 which are formed in the flange member 200. The inside-shaft radial bores 212 are joined to axially extending inside-shaft bores 211, and these axial bores 211, for example, the interior of a torque converter. This enables the supplying of an oil from the oil passages 221 of the housing 220 to the interior of a torque converter and the discharging of the oil from the latter to the former to be done.

When the flow passage structure is provided in this manner, the flow passage in the flange member 200 is formed by making the radial bores 202 extending from an outer circumferential surface of the flange member therethrough to the press-fit bore 201, and the axial bores 203 extending from a side surface of the flange member so as to communicate with the inside-flange radial bores 202, and closing the radial bores 202 of the flange member at the portions thereof which are on the side of an outer circumferential surface of the flange with plugs 205, and with balls 206 press-fitted into the mentioned portions of the same bores. As is understood from the above, the radial bores 202 in the flow passage structure shown in FIG. 5 are formed from the outer circumferential side of the flange, and it is therefore necessary that the radial bores 202 be closed at the outer circumferential end portions thereof with plugs 205 and press-fit balls 206. This causes a processing cost and a cost of additional parts to increase correspondingly. When the plugs 205 are employed, it is necessary that seal members be used for threaded portions thereof, and, when the press-fit balls 206 are employed, the flange member 200 requires to have a strength high enough to resist a press-fitting force. Furthermore, spaces for press-fitting the balls thereinto and inserting the plugs thereinto are needed, and, when plural radial bores 202 are formed in a certain way of arrangement, the intervals thereof have to be set large.

In view of these problems, a flow passage structure shown in FIG. 6 has also heretofore been devised. A left-hand portion of FIG. 6 shows a second flow passage structure, and a right-hand portion thereof a third flow passage structure. First, in the case of the second flow passage structure shown in the left-hand portion of FIG. 6, a communication bore 231 extending from a side surface of a flange member 230 therethrough diagonally to a press-fit bore 233 is formed, and an oil passage 221 in a housing 220 and a radial bore 212 formed in a shaft member 210 are communicated with each other via this inside-flange communication bore 231. In the case of this flow passage structure, the inside-flange communication bore 231 is formed from the side surface of the flange member 230, so that closing the bore by using a plug and a press-fit ball in an outer circumferential end portion thereof as in the structure of FIG. 5 is not necessary but an axial size A of the flange member 230 increases due to the formation of the diagonal communication bore.

In the case of the third flow passage structure shown in the right-hand portion of FIG. 6, an inside-flange flow passage is provided by forming a radial bore 242 extending from the interior of a press-fit bore 241 of a flange member 240 in the diagonal, radially outward direction, and an axial bore 243 extending from a side surface of the flange member 240 so as to communicate with the inside-flange radial bore 242. In the case of this flow passage structure, closing the bore by using a plug and a press-fit ball in outer circumferential end portions thereof as in the structure of FIG. 5 is not necessary, either. However, since the inside-flange radial bore 242 is formed from the interior of the press-fit bore 241 of the flange member 240, an angle of the inside-flange radial bore 242 is limited depending upon the size of the press-fit bore 241, so that it is difficult to form the bore 242 and reduce the dimensions of the flange member.

SUMMARY OF THE INVENTION

The present invention has been made in view of these circumstances, and provides a flow passage structure capable of forming a flow passage in a flange member easily, and a flange member compactly.

According to an aspect of the present invention, the flow passage structure for a shaft-press-fitted flange member (for example, a stator shaft 40 in a mode of embodiment) formed by press-fitting a shaft member into a press-fit bore of a flange member has a shaft member provided with first flow passages (for example, right end portions 106 of oil passages 102 in a mode of embodiment) having openings (for example, right end portions 106 of the oil passages 102 in the mode of embodiment) in an outer circumferential surface of the shaft member; and a flange member provided with blind bores (for example oil passages 101 and oil passages 105 in the mode of embodiment) formed so as to extend linearly at right angles to a shaft axis from outer circumferential surfaces (for example, outer circumferential surfaces 43b, 43c in the mode of embodiment) of the flange member and through the press-fit bore, and stop at free end portions thereof in the interior of the flange member, and communication bores (for example, oil passages 103) extending from a side surface of the flange member in the axial direction and communicating with the portions of the blind bores which extend from the press-fit bore to the free end portions thereof, second flow passages being formed of the portions (for example, the oil passages 101 in the mode of embodiment) of the blind bores which extend from the press-fit bore to the free end portions thereof and the communication bores, the shaft member being positioned so that the portions of the blind bores in the second flow passages which are opened into the press-fit bore and the first flow passages communicate with each other, and press-fitted into the press-fit bore to communicate the first and second flow passages with each other, whereby a flow passage structure is formed.

When a shaft member is press-fitted into a press-fit bore of a flange member in the case of a flow structure of such a construction, free end portions of blind bores and opposite portions (portions between an outer circumferential surface and the press-fit bore) are shut off by a shaft member press-fitted in the press-fit bore, and the free end portions communicate with openings of first flow passages formed in the shaft member. As is understood from the above, in the flow passage structure according to the present invention, only blind bores extending straight from an outer circumferential surface of the flange member in a direction (radial direction and a direction parallel thereto) which is at right angles to a shaft axis, and communication bores extending straight from a side surface of the flange member in the axial direction thereof are formed in the flange member. Namely, the forming of the flow structure can be done easily, and, since a diagonal bore is unnecessary, the flange member can be formed to a compact structure by reducing an axial size thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 1:
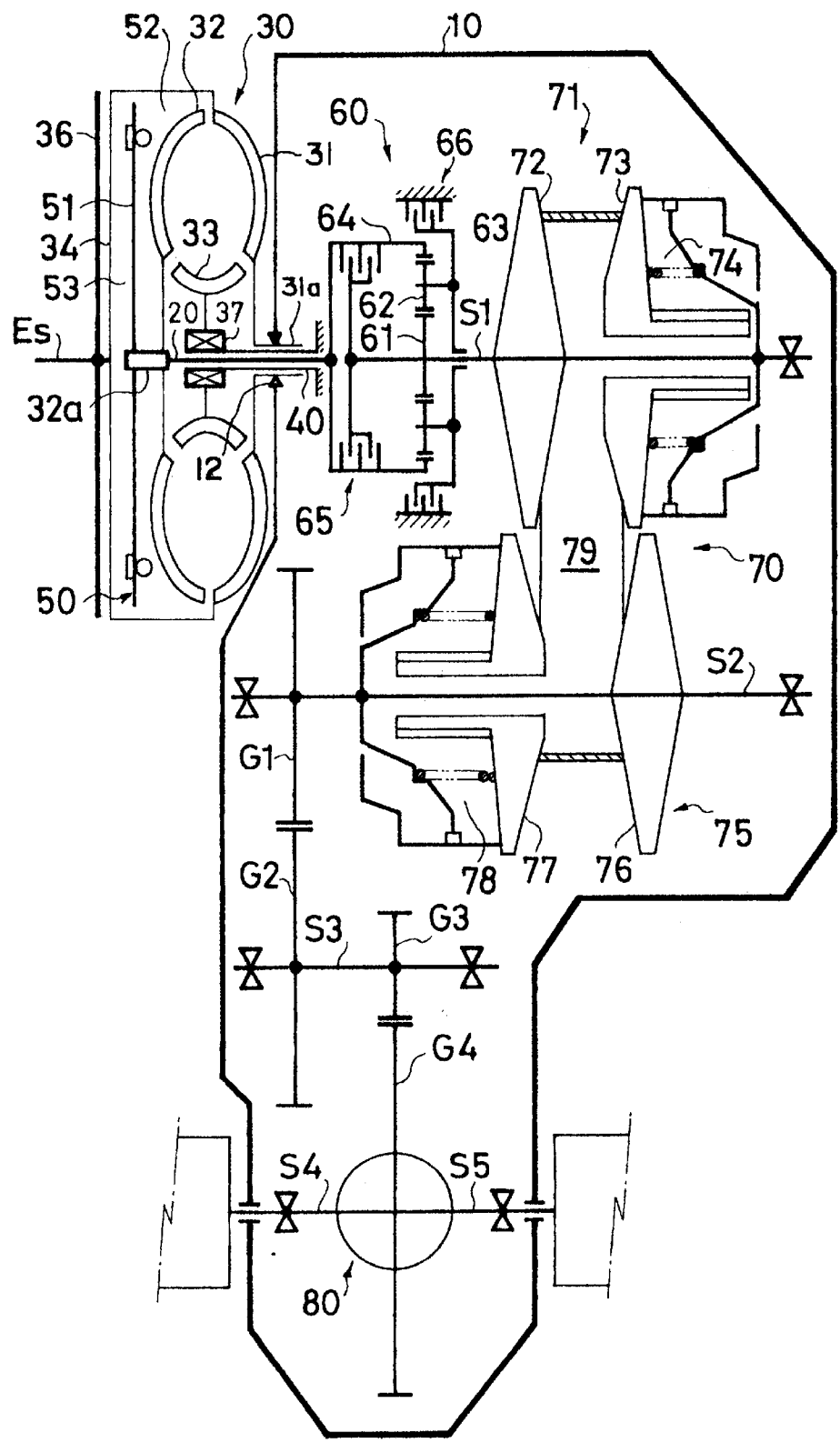
FIG. 1 is a schematic diagram showing the construction of a non-stage vehicular transmission formed by using the shaft-press-fitted flange member in the present invention for a stator shaft.

A preferred mode of embodiment of the flow passage structure for shaft-press-fitted flange members according to the present invention will now be described with reference to the drawings. In the embodiment to be described below, the shaft-press-fitted flange member in the present invention is used as a stator shaft supporting a stator of a torque converter. First, a non-stage vehicular transmission using this torque converter will now be described briefly with reference to FIG. 1.

This transmission is held in a transmission case 10, and an input shaft 20, a primary shaft S1, a secondary shaft S2, a countershaft S3, and left and right axle shafts S4, S5 are supported rotatably via bearings fixed to the transmission case 10. In this transmission, the input shaft 20 and primary shaft S1 are provided coaxially, and the secondary shaft S2 is positioned in parallel with and a predetermined distance away from the input shaft 20 (or the primary shaft S1). The counter shaft S3 is positioned in parallel with and a predetermined distance away from the secondary shaft S2, and the left and right axle shafts S4, S5 are provided coaxially, and positioned in parallel with and a predetermined distance away from the counter shaft S3.

Into the input shaft 20, the power from an engine (not shown) is inputted via a torque converter 30. The torque converter 30 has a pump impeller 31, a turbine runner 32 and a stator 33, and the pump impeller 31 is made integral with a converter cover 34, which covers an outer circumference thereof, and mounted fixedly on a crankshaft Es of the engine via a drive plate 36 to which a star gear is fixed. The turbine runner 32 is combined with the input shaft 20 via a turbine runner hub 32a, and the stator 33 is fixed to a shaft member 41 (corresponding to the shaft member defined in Claims) via a one-way clutch 37.

Figure 2:
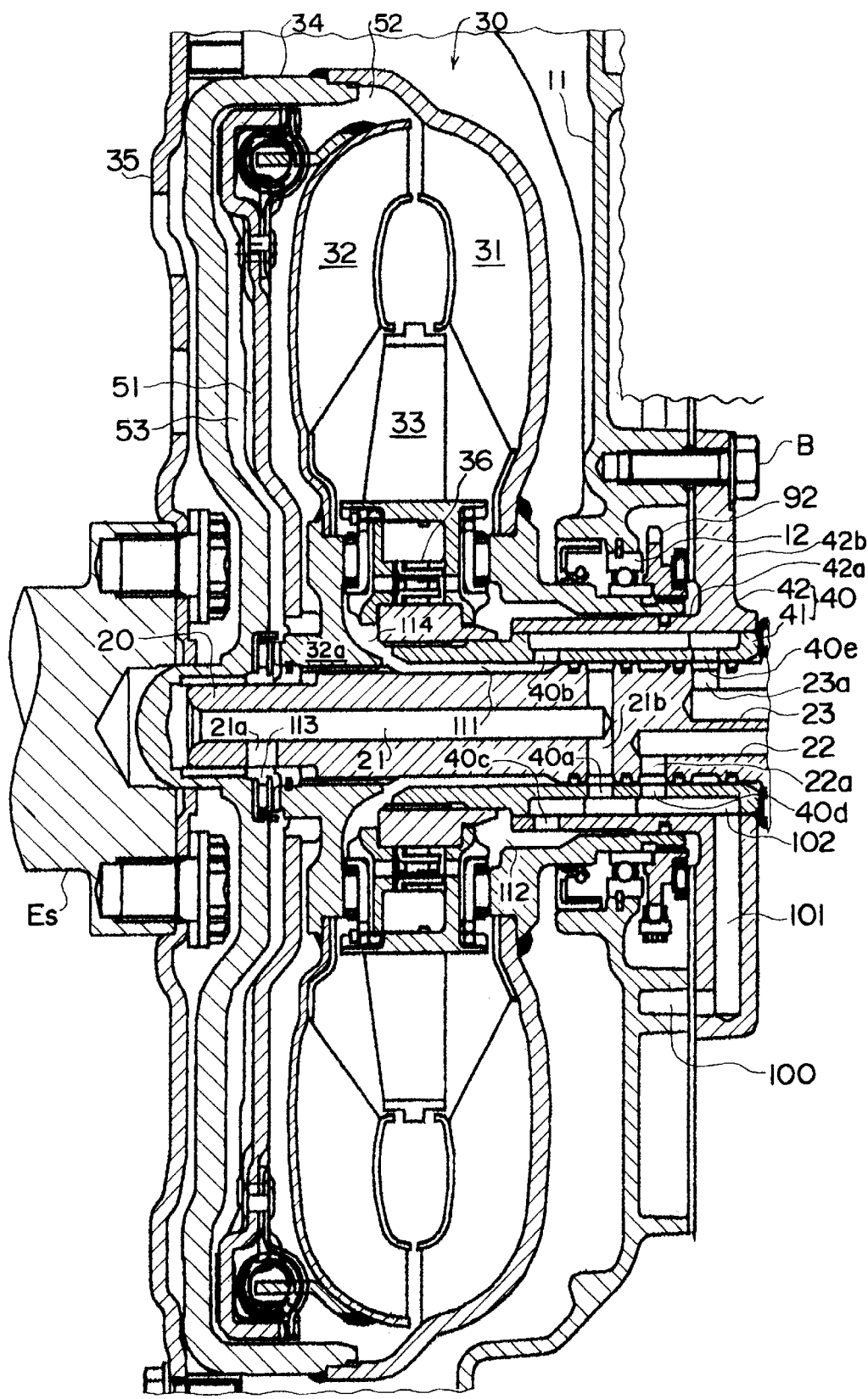
FIG. 2 is a sectional view showing on an enlarged scale a portion around a torque converter of the same non-stage vehicular transmission.
Figure 3:
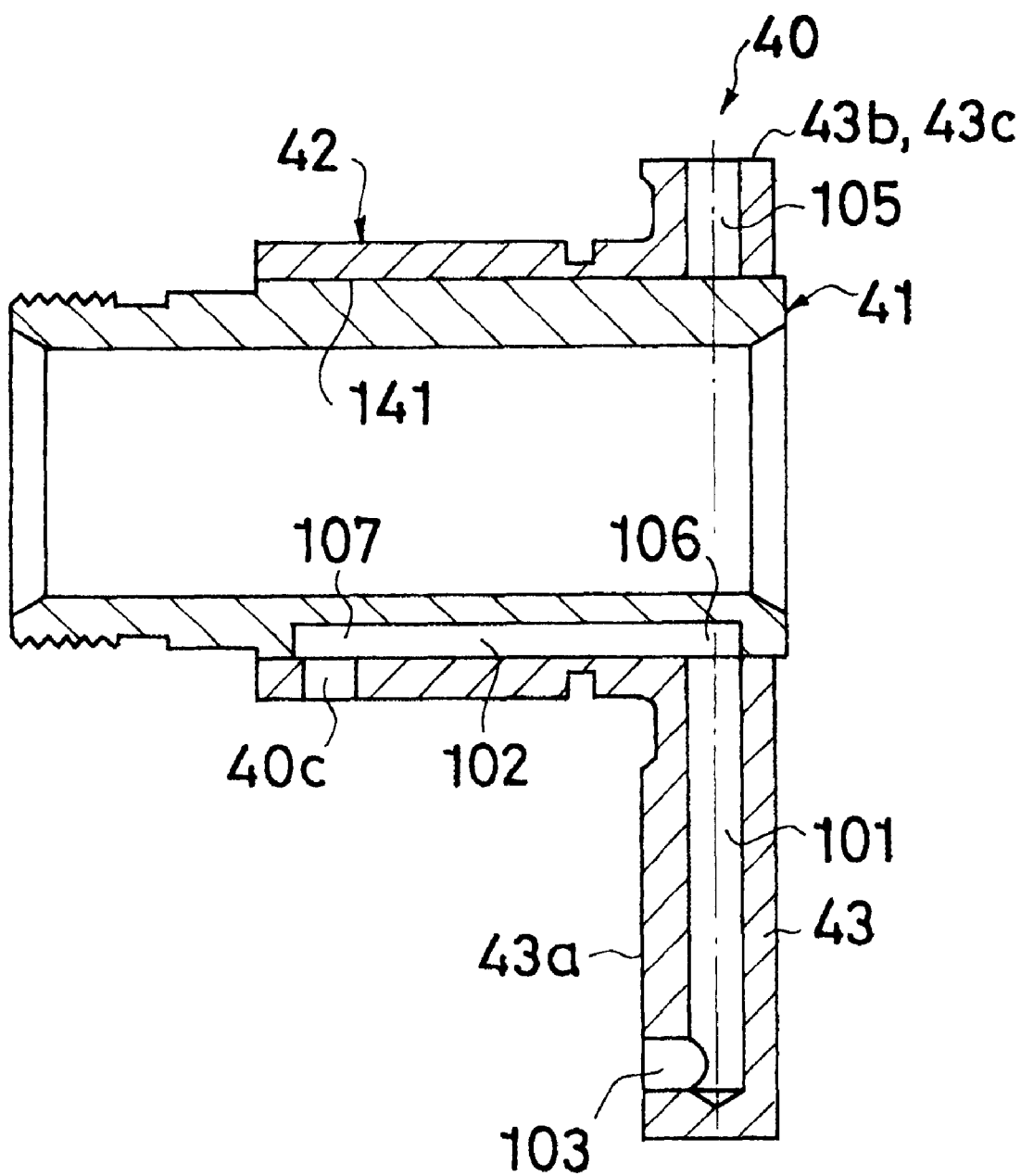
FIG. 3 is a sectional view showing a stator shaft of the same torque converter.

As shown in detail in FIGS. 2 and 3, the shaft member 41 positioned on an outer circumferential side of the input shaft 20 and mounted fixedly with a stator 33 (and one-way clutch 37), and a flange member 42 (corresponding to the flange member defined in the Claims) into which the shaft member 41 is press-fitted to be formed into a unitary structure therewith constitute a stator shaft 40 (corresponding to the shaft-press-fitted flange member defined in the Claims). The flange member 42 has a press-fit bore 141 into which the shaft member 41 is press-fitted, and a flange portion 43, and is fixed at the flange portion 43 to a partition wall 11 of the transmission case 10 by bolts B, whereby the stator shaft 40 is fixed.

The pump impeller 31 is combined with a left end portion of a boss member 31a positioned on an outer circumferential surface of the flange member 42, and an outer circumferential surface of this boss member 31a is supported rotatably via a bearing 12 provided on the partition wall 11. Therefore, the input shaft 20, stator shaft 40 and boss member 31a are in a coaxially positioned condition.

A pump drive gear 92 is mounted fixedly on a right end portion of the boss member 31a, and connected via a chain to a pump driven gear mounted on a rotor shaft of an oil pump (vane pump).

The torque converter 30 is provided with a lockup mechanism 50 adapted to press a lockup clutch position 51, which is fixed to the turbine runner hub 32a, against an inner surface of the converter cover 34 and engages these two members 51, 34 with each other, whereby the power from the engine can be transmitted directly to the input shaft 20. Such an operation of the lockup clutch piston 51 is carried out by supplying and discharging an oil to and from two oil chambers, which are formed by partitioning a space in the torque converter 30 into two by the lockup clutch 51, i.e. an oil chamber 52 (which will be called a turbine side oil chamber 52) formed closer to the turbine runner 32 then to the lockup clutch 51, and an oil chamber (which will be called a cover side oil chamber 53) formed closer to the converter cover 34 than to the lockup clutch piston 51. An oil passage structure for supplying an oil to the two oil chambers 52, 53 thus formed and discharging the oil therefrom shows an example of the flow passage structure according to the present invention, the details of which will be described later.

The power of the input shaft 20 is transmitted to the primary shaft S1 via a forward and backward movement change-over mechanism 60. As shown in FIG. 1, the forward and backward movement change-over mechanism 60 is formed by a sun gear 61 mounted fixedly on the primary shaft S1, plural pinion gears 62 engaged with the sun gear 61 from an outer side thereof, a carrier 63 rotatable with respect to the primary shaft S1 and supporting the plural pinion gears 62 rotatably, and a ring gear 64 mounted fixedly on the input shaft 20 and engaged with the plural pinion gears 62 from an outer side thereof. The primary shaft S1 and ring gear 64 can be engaged with each other by hydraulically operating a forwarding clutch 65, and the carrier 63 and transmission case 10 by hydraulically operating a backing brake 66.

When the forwarding clutch 65 is engaged with the backing brake 66 disengaged, the input shaft 20, ring gear 64, pinion gears 62, sun gear 61 and carrier 63 are rotated together, so that the primary shaft S1 is rotated in the same direction as the input shaft 20. When the forwarding clutch 65 is disengaged with the backing brake 66 engaged, the rotation of the input shaft 20 is transmitted to the sun gear 61 by the carrier 63 via the pinion gears 62, to which rotary shafts are fixed, so that the primary shaft S1 is rotated in the direction opposite to the direction of rotation of the input shaft 20.

The power of the primary shaft S1 is transmitted to the secondary shaft S2 via a belt type non-stage transmission 70 formed of a driving pulley 71 mounted on the primary shaft S1, a driven pulley 75 mounted on the secondary shaft S2, and a metal V-belt 79 passed around these two pulleys 71, 75.

The driving pulley 71 is formed of a fixed half pulley body 72 mounted fixedly on the primary shaft S1, and a movable half pulley body 73 mounted on the primary shaft S1 so that the movable half pulley body 73 is opposed to the fixed half pulley body 72 and can be moved slidingly thereon in the axial direction. A distance (pulley width) between the fixed half pulley body 72 and movable half pulley body 73 can be varied by moving the movable half pulley body 73 by supplying an oil to the interior of a hydraulic cylinder 74 and discharging the oil therefrom. The driven pulley 75 is formed of a fixed half pulley body 76 mounted fixedly on the secondary shaft S2, and a movable half pulley body 77 mounted on the same shaft S2 so that the movable half pulley body 77 is opposed to the fixed half pulley body 76 and can be moved slidingly thereon in the axial direction. A distance (pulley width) between the fixed half pulley body 76 and movable half pulley body 77 can be varied by supplying an oil to the interior of a hydraulic cylinder 78 and discharging the oil therefrom. A radius of winding of the metal V-belt 79 can be varied by regulating a width of these two pulleys, and this enables the non-stage variation of a gear ratio of one of the two shafts S1, S2 to the other to be attained.

The power inputted into the secondary shaft S2 is transmitted to the countershaft S3 via gears G1, G2, and further to a differential mechanism 80 via a final drive gear G3 and a final driven gear G4. In the differential mechanism 80, the input power is transmitted in a divided state to left and right front axle shafts S4, S5 to drive left and right wheels (front wheels) (not shown) provided on respective end portions of the two shafts S4, S5.

Thus, in this transmission, the power of the engine inputted into the input shaft 20 via the torque converter 30 is transmitted to the left and right front wheels via the forward and backward movement change-over mechanism 60 and belt-type non-stage transmission 70, whereby a vehicle can travel. An arbitrary gear ratio can be obtained in a non-stepped manner by operating the belt type non-stage transmission 70 in the above-described manner. The switching of the direction in which the vehicle travels is done by an operation of the forward and backward movement change-over mechanism 70.

A detailed construction of the stator shaft 40 using the flow passage structure according to the present invention will now be described. First, as shown in FIG. 2, the input shaft 20 is provided therein with first to third oil passages 21, 22, 23 which constitute oil supply and discharge passages. The first oil passage 21 is an oil passage for supplying an oil to the cover side oil chamber 53 of the converter 30 and discharging the oil from the latter to the former, and this oil passage 21 is provided at left and right end portions thereof with opened oil passages 21a, 21b. The second and third oil passages 22, 23 are oil passages for supplying an oil to the forward and backward movement change-over mechanism 60 and belt type non-stage transmission 70 and discharging the oil from the latter to the former. Therefore, an oil passage 22a communicates with the second oil passage 22, and an oil passage 23a the third oil passage 23. The oil is supplied from these oil passages 22a, 23a to the forward and backward movement change-over mechanism 60 and belt type non-stage transmission 70, and discharged from the latter to the former. Accordingly, an oil passage 22a communicates with the second oil passage 22, and an oil passage 23a the third oil passage 23, and the oil is supplied from these oil passages 22a, 23a to the forward and backward movement change-over mechanism 60 and belt type non-stage transmission 70, and discharged from the latter to the former.

Figure 4:
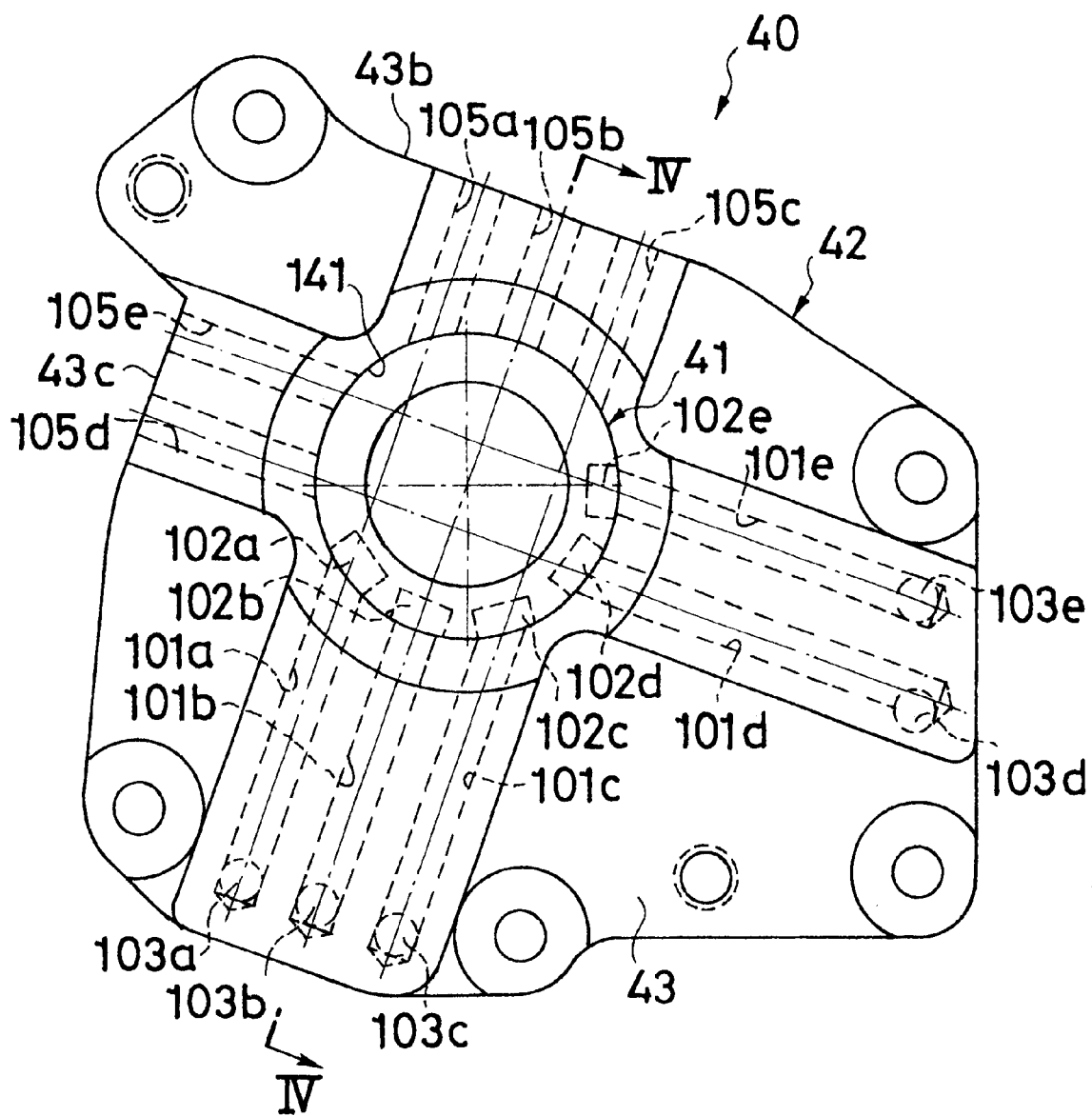
FIG. 4 is a side view showing the stator shaft of the same torque converter.
Figure 5:
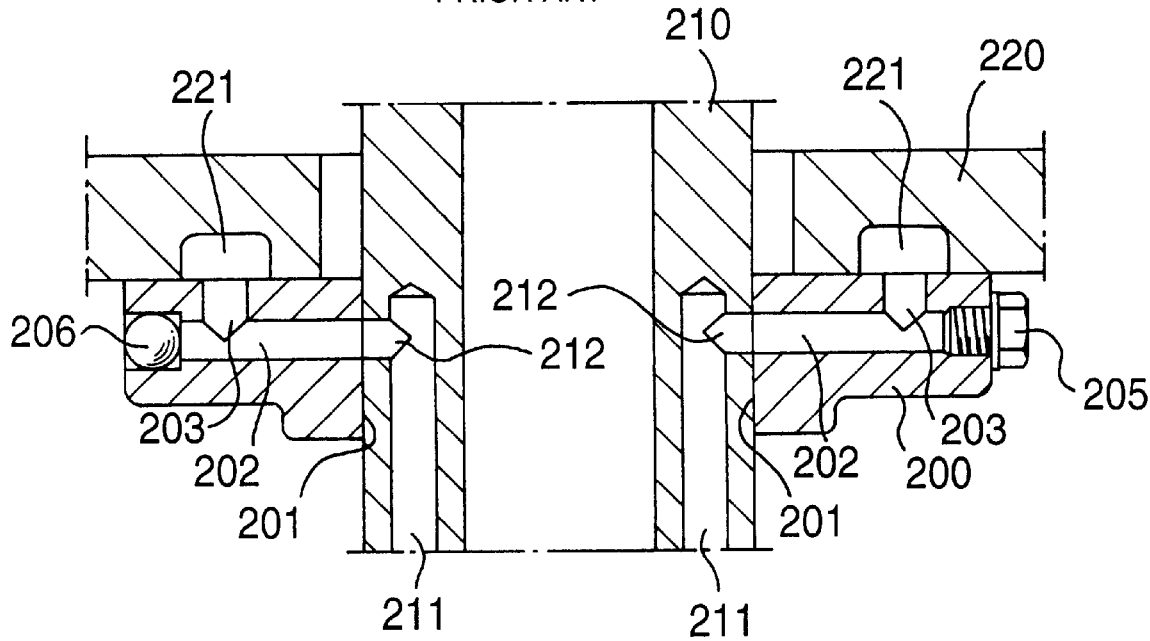
FIG. 5 is a sectional view showing a related art flow passage structure for shaft-press-fitted flange members.
Figure 6:
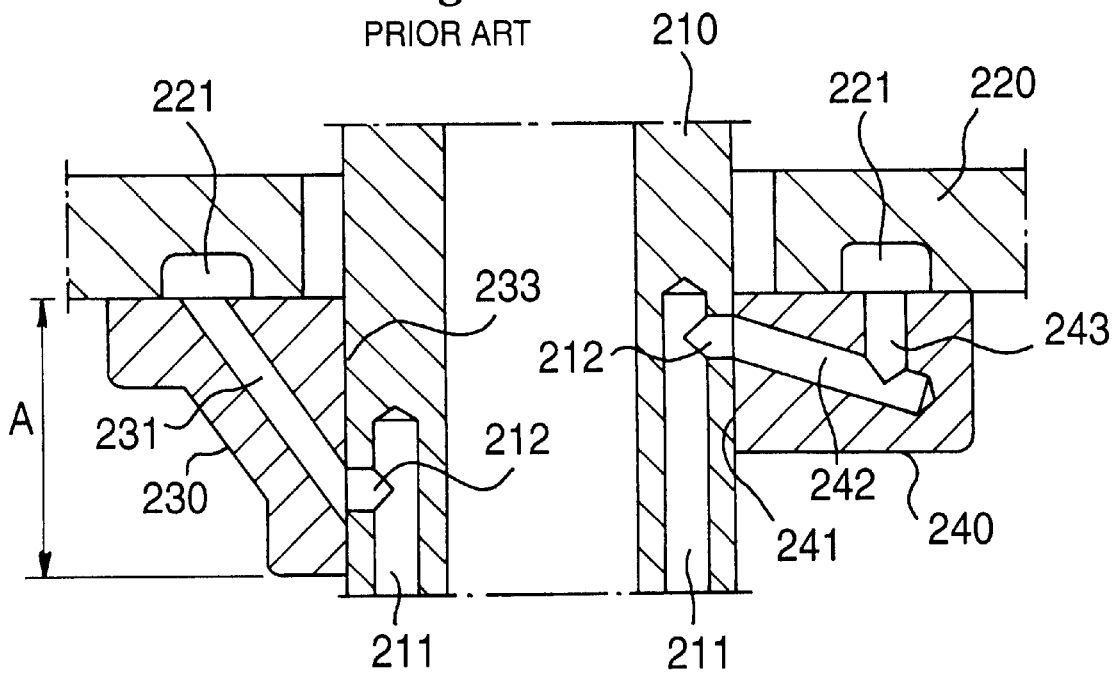
FIG. 6 is a sectional view showing a related art flow passage structure of shaft-press-fitted flange members.

As is understood from FIGS. 3 and 4 as well, the stator shaft 40 is provided in the flange member 42 (flange portion 43) thereof with five oil passages 101a, 101b, 101c, 101d, 101e (representatively shown by the oil passages 101 in FIGS. 2 and 3) extending at right angles to a shaft axis. Five oil passages 102a, 102b, 102c, 102d, 102e (representatively shown by the oil passages 102 in FIGS. 2 and 3) communicating with these oil passages 101a–101e respectively are formed between an outer circumferential surface of the shaft member 41 and an inner circumferential surface of the flange member 42. Furthermore, five oil passages 103a, 103b, 103c, 103d, 103e (representatively shown by the oil passages 103 in FIGS. 2 and 3) are formed which extend axially from a side surface 43a of the flange portion 43 of the flange member 42 and communicate with the five oil passages 101 (101a, 101b, 101c, 101d, 101e) respectively. In this structure, the oil passages 102 correspond to first flow passage defined in the claims, and the oil passages 101, 103 formed in the flange member 42 the second oil passages defined in the claims. In this example, first and second flow passages including five flow passages each are formed, and opposed first and second flow passages communicate with each other to form five independent flow passages.

The shaft member 41 is provided with oil passage openings 40a, 40b, 40d, 40e constituting outlet ports of the oil passages 102a, 102b, 102d, 102e, and the flange member 42 an oil passage opening 40c constituting an outlet port of the oil passage 102c. The oil passage opening 40a communicates the oil passage 102a and the communication oil passage 21b of the first oil passage 21 with each other. The oil passage opening 40b communicates with each other the oil passage 102b and an oil passage space 111 formed between the input shaft 20 and the shaft member 41 of the stator shaft 40. The oil passage opening 40c communicates with each other the oil passage 102c and a space 112 formed between the stator shaft 40 and boss members 31a, and the oil passage opening 40d the oil passage 102d and the communication oil passage 22a of the second oil passage 22. The oil passage opening 40e communicates the oil passage 102e and the communication passage 23a of the third oil passage 23 with each other.

The five oil passages 103 (103a, 103b, 103c, 103d, 103e) formed in the flange portion 43 of the flange member 42 communicate respectively with five oil supply ports 100a, 100b, 100c, 100d, 100e (representatively shown by the oil supply ports 200 in FIG. 2) formed in the transmission case 10, whereby the supplying of corresponding oils is done. Consequently, predetermined oils are supplied to predetermined parts respectively to carry out the controlling of the operations of the lockup clutch, forward and backward movement change-over mechanism 60 and non-stage transmission 70.

The oil passages used to carry out the supplying of these five different oils are formed in the stator shaft 40 as mentioned above. The construction of these oil passages will now be described in detail with reference to FIGS. 3 and 4.

As is understood from the two drawings, the oil passages 101 are formed of processed drill bores extending from the outer circumferential surfaces 43b, 43c of the flange member 43 at right angles to a shaft axis. These drill bores have three blind bores extending side by side in parallel with one another from the outer circumferential surface 43b in the direction which is at right angles to the shaft axis, further through the press-fit bore 141, into which the shaft member 41 is to be press-fitted, and then toward the opposite side of one of the mentioned outer circumferential surfaces, which is beyond the press-fit bore 141 but within the flange portion 43; and two blind bores extending side by side in parallel with each other from the outer circumferential surface 43c in the direction which is at right angles to the shaft axis, further through the press-fit bore 141, into which the shaft member 41 is to be press-fitted, and then toward the opposite side of the outer circumferential surface 43c beyond the press-fit bore 141 but within the flange portion 43. As shown in the drawing, in three drill bores formed so as to extend from the outer circumferential surface 43b, inlet portions thereof, which extend from the outer circumferential surface 43c to the press-fit bore 141, are represented by numbers 105a, 105b, 105c, while rear portions of the same drill bores which extend through the press-fit bore 141 toward the opposite portion of the surface 43b constitute the above-mentioned oil passages 101a, 101b, 101c. Similarly, in the two drill bores formed so as to extend from the outer circumferential surface 43c, inlet portions extending from the outer circumferential surface 43c to the press-fit bore 141 are represented by numbers 105d, 105e, while rear portions of the drill bores which extend through the press-fit bore 141 toward the opposite portion of the surface 43c constitute the above-mentioned oil passages 101d, 101e.

After the five blind bores are thus formed, the shaft members 41 is press-fitted into the press-fit bore 141 as shown in the drawings. The shaft member 41 is provided in an outer circumferential surface thereof with five axially extending grooves, which are covered with the flange member 42 with the shaft member press-fitted in the press-fit bore 141, to form the above-mentioned oil passages 102 (102a, 102b, 102c, 102d, 102e). In the condition in which the shaft member 41 is thus press-fitted in the press-fit bore, right end portions 106 of the oil passages communicate with the oil passages 101 (101a, 101b, 101c, 101d, 101d, 101e) formed of the rear portions of the drill bores. Left end portions 107 of the oil passages communicate with the oil passage openings 40a, 40b, 40c, 40d, 40e formed in the shaft member 41 or the flange member 42 as mentioned above.

As a result, the first flow passages provided in the shaft member 41 and formed of the oil passages 102 communicate with the second flow passages provided in the flange member 42 and formed of the oil passages 101, 103, whereby five independent oil passages are formed. In this structure, the rear portions of the drill bores formed from the outer circumferential surface of the flange member 43 communicate directly with the oil passages of the press-fitted inner cylindrical member 41, and the inlet portions 105a–105e do not specially require to be closed, so that the drill bores are easily formed. Although the first flow passages 102 in this embodiment are formed in the outer circumferential of the shaft member 41, it is also possible to form the first flow passages 102 in an inner portion of the shaft member 41, and additionally oil passages communicating these flow passages and the outer circumferential surface of the shaft member 41 with each other, and press-fitting the shaft member into the flange member so that these oil passages and second flow passages communicate with each other. In the former case, the formation of the flow passages is carried out simply, and, in the latter case, long oil passages can be formed simply by extending the same through the shaft.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 11-349656 filed on Dec. 9, 1999, which is incorporated herein by reference.

What is claimed is:

1. A flow passage structure for shaft-press-fitted flange members, comprising:

a flange member containing a flange portion and being provided with a press-fit bore extending along a longitudinal axis and being opened at least one axial end thereof, a shaft member press-fitted into the interior of the press-fit bore, first flow passages formed in the shaft member, blind bores formed so as to extend linearly in a direction which is at right angles to the shaft axis from outer circumferential surfaces of the flange portion of the flange member, and said bores further extending transversely through the press-fit bore, and having closed end portions in an inner portion of the flange portion, and communication bores formed to extend from a side surface of the flange member in an axial direction and to communicate with parts of the blind bores which extend from the press-fit bore to the closed end portions thereof, second flow passages being formed of the parts of the blind bores which extend from the press-fit bore to the closed end portions thereof, and the communication bores, and the shaft member being press-fitted into the press-fit bore so that the portions of the second flow passages which are opened in the press-fit bore and the first flow passages communicate with each other, whereby the first and second flow passages are communicated with each other.

2. A flow passage structure for shaft-press-fitted flange members according to claim 1, wherein the flange member is formed of a cylindrical portion provided therein with the press-fit bore, and the flange portion extending from an end part of the cylindrical portion in the outer circumferential direction thereof, the blind bores being formed so as to extend from the outer circumferential surface of the flange portion in the direction which is at right angles to the shaft axis.

3. A flow passage structure for shaft-press-fitted flange members according to claim 2, wherein the flange member 42 and shaft member 41 constitute a stator shaft supporting a stator of a torque converter 30, the flange portion 43 being held fixedly.

4. A flow passage structure for shaft-press-fitted flange members, comprising:
- a flange member provided therein with a press-fit bore opened at least one axial end thereof,
- a shaft member press-fitted into the interior of the press-fit bore,
- first flow passages formed in the shaft member,
- blind bores formed so as to extend linearly in a direction which is at right angles to a shaft axis from outer circumferential surfaces of the flange member, and further through the press-fit bore, and stop at free end portions thereof in an inner portion of the flange member, and
- communication bores formed so as to extend from a side surface of the flange member in the axial direction and communicate with the parts of the blind bores which extend from the press-fit bore to the free end portions thereof,
- second flow passages being formed of the parts of the blind bores which extend from the press-fit bore to the free end portions thereof, and the communication bores,
- the shaft member being press-fitted into the press-fit bore so that the portions of the blind bores in the second flow passages which are opened in the press-fit bore and the first flow passages communicate with each other, whereby the first and second flow passages are communicated with each other, wherein the shaft member 41 is formed to a hollow cylindrical shape so that the shaft member 41 is press-fitted into the press-fit bore 141, and the shaft member 41 being provided in the outer circumferential surface thereof with axially extending grooves, which are covered with the press-fit bore 141 and the shaft member 41 press-fitted therein, whereby the first flow passages are formed.

5. A flow passage structure for shaft-press-fitted flange members, comprising:
- a flange member 42 provided therein with a press-fit bore 141 opened at least one axial end thereof,
- a shaft member 41 press-fitted into the interior of the press-fit bore 141,
- first flow passages 102 formed in the shaft member 41,
- blind bores 105 formed so as to extend linearly in a direction which is at right angles to a shaft axis from outer circumferential surfaces 43b, 43c of the flange member 42, and further through the press-fit bore 141, and stop at free end portions thereof in an inner portion of the flange member 42, and
- communication bores formed so as to extend from a side surface of the flange member 42 in the axial direction and communicate with the parts of the blind bores which extend from the press-fit bore 141 to the free end portions thereof,
- second flow passages being formed of the parts of the blind bores which extend from the press-fit bore 141 to the free end portions thereof, and the communication bores,
- the shaft member 41 being press-fitted into the press-fit bore so that the portions of the blind bores in the second flow passages which are opened in the press-fit bore 141 and the first flow passages communicate with each other, whereby the first and second flow passages are communicated with each other, wherein plural blind bores 105 are formed in parallel with each other in the flange member 42.

* * * * *